(12) United States Patent  
Hu et al.

(10) Patent No.: US 11,906,889 B2  
(45) Date of Patent: Feb. 20, 2024

(54) LIGHT SOURCE SYSTEM AND PROJECTION APPARATUS

(71) Applicant: APPOTRONICS CORPORATION LIMITED, Guangdong (CN)

(72) Inventors: Fei Hu, Shenzhen (CN); Haixiong Hou, Shenzhen (CN); Xiaofeng Tang, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 546 days.

(21) Appl. No.: 16/960,069

(22) PCT Filed: Mar. 28, 2018

(86) PCT No.: PCT/CN2018/080874  
§ 371 (c)(1),  
(2) Date: Oct. 15, 2021

(87) PCT Pub. No.: WO2019/134266  
PCT Pub. Date: Jul. 11, 2019

(65) Prior Publication Data  
US 2022/0035230 A1     Feb. 3, 2022

(30) Foreign Application Priority Data

Jan. 4, 2018    (CN) .......................... 201810008071.4

(51) Int. Cl.  
   *G03B 21/20*        (2006.01)  
   *G02B 27/10*        (2006.01)

(52) U.S. Cl.  
CPC ....... *G03B 21/204* (2013.01); *G02B 27/1006* (2013.01); *G03B 21/206* (2013.01);  
(Continued)

(58) Field of Classification Search  
CPC .............. G03B 21/204; G03B 21/2013; G03B 21/206; G03B 21/2066; G03B 21/208;  
(Continued)

(56) References Cited

U.S. PATENT DOCUMENTS

2011/0292349 A1    12/2011   Kitano et al.  
2012/0268503 A1*   10/2012   Sugiyama ............ H04N 9/3161  
                                                           362/84  
(Continued)

FOREIGN PATENT DOCUMENTS

CN         101937162 A       1/2011  
CN         202548516 U     11/2012  
(Continued)

OTHER PUBLICATIONS

Office Action issued in Chinese application No. 201810008071.4 dated Jan. 29, 2021.  
(Continued)

*Primary Examiner* — Magda Cruz  
(74) *Attorney, Agent, or Firm* — Knobbe, Martens, Olson & Bear LLP (57) ABSTRACT

A light source system and a projection apparatus are provided. The light source system includes a first light source, a second light source including a second blue laser light source, a wavelength conversion element configured to convert second blue laser light into excited light, and a controller. The first light source includes a first blue laser light source configured to emit first blue laser light, a red laser light source configured to emit red laser light, and a green laser light source configured to emit green laser light. The controller controls the first and second blue laser light sources, the red laser light source, and the green laser light source to combine the first blue laser light, the red laser light, and the green laser light to form light source light, or to  
(Continued)

combine the first blue laser light and the excited light to form the light source light.

20 Claims, 4 Drawing Sheets

(52) U.S. Cl.
CPC ....... *G03B 21/208* (2013.01); *G03B 21/2013* (2013.01); *G03B 21/2066* (2013.01)

(58) Field of Classification Search
CPC .. G03B 33/08; G02B 27/1006; H04N 9/3152; H04N 9/3155; H04N 9/3161; H04N 9/3164; H04N 9/3182; H04N 9/3158
See application file for complete search history.

(56) References Cited

U.S. PATENT DOCUMENTS

| | | | | |
|---|---|---|---|---|
| 2013/0083295 | A1 | 4/2013 | Miyazaki | |
| 2017/0048501 | A1* | 2/2017 | Li | G02B 27/146 |
| 2017/0255092 | A1* | 9/2017 | Hu | G03B 21/206 |
| 2017/0315430 | A1* | 11/2017 | Wang | G02B 26/008 |
| 2018/0080630 | A1* | 3/2018 | Wang | G03B 21/2013 |
| 2019/0037185 | A1* | 1/2019 | Tarpan | H04N 9/3182 |

FOREIGN PATENT DOCUMENTS

| | | | | |
|---|---|---|---|---|
| CN | 103186026 | A | 7/2013 | |
| CN | 103189794 | A | 7/2013 | |
| CN | 103324014 | A | 9/2013 | |
| CN | 103529630 | A | 1/2014 | |
| CN | 104102082 | A | 10/2014 | |
| CN | 104166300 | A | 11/2014 | |
| CN | 104765239 | A | 7/2015 | |
| CN | 104865783 | A | 8/2015 | |
| CN | 105116679 | A | 12/2015 | |
| CN | 106154711 | A | 11/2016 | |
| CN | 106200229 | A | 12/2016 | |
| CN | 106292142 | A | 1/2017 | |
| CN | 106371272 | A * | 2/2017 | ............ G03B 21/00 |
| CN | 106383428 | A | 2/2017 | |
| CN | 205992114 | U | 3/2017 | |
| CN | 206311878 | U | 7/2017 | |
| CN | 107329356 | A | 11/2017 | |
| CN | 206819040 | U | 12/2017 | |
| WO | WO 2016/165569 | | 10/2016 | |

OTHER PUBLICATIONS

J. Kuo and T. Fang, "Design of the opto-mechatronic system for the LED projector," TENCON 2007—2007 IEEE Region 10 Conference, Taipei, Taiwan, 2007, pp. 1-4, doi: 10.1109/TENCON.2007.4428970.

International Search Report of corresponding PCT Application No. PCT/CN2018/080874—4 pages (Sep. 29, 2018).

European Search Report received in EP Application No. 18898308.4, dated Jul. 28, 2021, 11 pages.

* cited by examiner

LIGHT SOURCE SYSTEM AND PROJECTION APPARATUS

TECHNICAL FIELD

The present disclosure relates to the field of projection technology and, in particular, to a light source system and a projection apparatus.

BACKGROUND

This section is intended to provide a background or context for implementations of embodiments of the present disclosure set forth in the claims and the detailed description. The description here is not acknowledged as prior art just because it is included in this section.

Generally, when being applied in different occasions, color gamut requirements for projection or reproduction equipment are different. In existing projection apparatuses, one projection apparatus generally can support only one of color gamut standards in the existing projection field. For example, only a DCI color gamut or only a Rec. 2020 color gamut is supported, and dynamic color gamut adjustment of various color gamuts cannot be achieved in one projection or reproduction equipment.

SUMMARY

The present disclosure provides a light source system, and color coordinates of light source light emitted by the light source system can be dynamically adjusted. The present disclosure also provides a projection apparatus including the light source system, which can realize dynamic color gamut adjustment.

A light source system includes a first light source, a second light source comprising a second blue laser light source, a wavelength conversion element, and a controller. The first light source includes a first blue laser light source configured to emit first blue laser light, a red laser light source configured to emit red laser light, and a green laser light source configured to emit green laser light. The wavelength conversion element is configured to convert second blue laser light into excited light. The controller is configured to turn on or turn off the first blue laser light source, the red laser light source, the green laser light source and the second blue laser light source so as to combine the first blue laser light, the red laser light, and the green laser light to form light source light, or to combine the first blue laser light and the excited light to form the light source light.

A projection device includes the light source system as described above.

The controller provided by the present disclosure turns on or off the first blue laser light source, the second blue laser light, the red laser light, and the green laser light so that the light source system and the projection apparatus including the light source system can adjust the dynamic color gamut.

SYMBOL DESCRIPTION OF COMPONENTS

Light source system 100, 200
First light source 110
First blue laser light source 111, 211
Red laser light source 112, 212
Green laser light source 113, 213
Second light source 120, 220
Second blue laser light source 121, 221
Controller 125, 225
Adjustment device 130, 230
First light splitting and combining element 140, 240
Coating region 141, 241
Edge region 142, 242
Relay lens 150, 250
Second light splitting and combining element 160, 260
Reflective element 265
Collecting lens group 170, 270
Wavelength conversion element 180, 280
Driving unit 181
Light homogenizing device 190, 290

The following specific embodiments will further illustrate the present disclosure with reference to the above accompany drawings.

DESCRIPTION OF EMBODIMENTS

Figure 1:
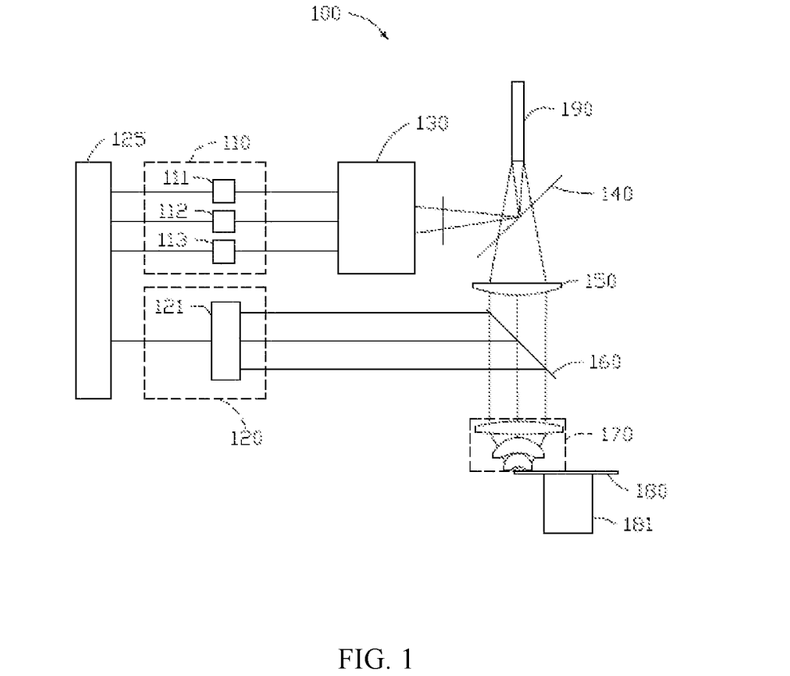
FIG. 1 is a schematic diagram of a light source system provided by a first embodiment of the present disclosure.

Referring to FIG. 1, FIG. 1 is a schematic diagram of a light source system 100 according to a first embodiment of the present disclosure. The light source system 100 includes a first light source 110, a second light source 120, a wavelength conversion element 180, a controller 125, an adjustment device 130, a first light splitting and combining element 140, a relay lens 150, a second light splitting and combining element 160, a collecting lens group 170 and a light homogenizing device 190. The first light source 110 and the second light source 120 are located at a same side of the wavelength conversion element 180.

The first light source 110 includes: a first blue laser light source 111 configured to emit first blue laser light (465 nm), a red laser light source 112 configured to emit red laser light (639 nm), and a green laser light source 113 configured to emit green laser light (520 nm). The second light source 120 includes a second blue laser light source 121 configured to emit second blue laser light (455 nm) having a wavelength range that does not overlap with a wavelength range of the first blue laser light emitted by the first blue laser light source 111. The wavelength conversion element 180 is configured to convert the second blue laser light into excited light.

Further, the first blue laser light source 111, the red laser light source 112, the green laser light source 113, and the second blue laser light source 121 each include a light emitter of a corresponding color, which is a laser or a laser array, and the number of the lasers can be selected according to actual needs. The first light source 110 and the second light source 120 each can further include a light homogenizing device configured to homogenize light to be emitted, and the light homogenizing device can include a fly-eye lens or a light homogenizing stick.

The second light splitting and combining element 160 is disposed between the second blue laser light source 121 and the wavelength conversion element 180. The second light splitting and combining element 160 is configured to guide the second blue laser light emitted from the second blue laser light source 121 to the collecting lens group 170.

The collecting lens group 170 includes a plurality of lenses having different focal lengths and is disposed adjacent to the wavelength conversion element 180. The focal length of the lens decreases as the distance of the lens from the wavelength conversion element 180. In this way, the collecting lens group 170 is capable of condensing the second blue laser light to a surface of the wavelength conversion element 180 and then a relatively small light spot is formed on a surface of the wavelength conversion element 180.

The surface of the wavelength conversion element 180 is provided with a wavelength conversion material for performing a wavelength conversion on a part of the second blue laser light incident thereon to obtain the excited light. The wavelength conversion element 180 is driven by a driving unit 181 to rotate or to move linearly back and forth in a periodic manner so that the second blue laser light can irradiate different regions of the surface of the wavelength conversion element 180 in a time-division manner, thereby avoiding decreasing of a conversion efficiency of the wavelength conversion material due to a high temperature resulted from a long-time irradiation on a partial region, which is relatively small, of the surface of the wavelength conversion element 180 with high-power incident light. The wavelength conversion element 180 performs periodical motion under the driving of the driving unit 181, which ensures a constant conversion efficiency of the wavelength conversion element 180.

The excited light emitted by the wavelength conversion element 180 is Lambertian light. The excited light and an unconverted part of the second blue laser light are incident to the collecting lens group 170 after being reflected by a reflective substrate of the wavelength conversion element 180, and the excited light and the second blue laser light are symmetrical about an optical axis of the collecting lens group 170.

The excited light emitted from the wavelength conversion element 180 is incident to the second light splitting and combining element 160 after being collimated by the collecting lens group 170, and the second light splitting and combining element 160 guides the excited light to the relay lens 150. The second light splitting and combining element 160 is configured to reflect the second blue laser light and transmit the excited light so that the unconverted part of the second blue laser light cannot pass through the second light splitting and combining element 160 to be combined with light emitted by the first light source. The second light splitting and combining element 160 can be a dichroic filter coated with a reflective film.

The relay lens 150 is disposed between the second light splitting and combining element 160 and the first light splitting and combining element 140, and excited light emitted from the second light splitting and combining element 160 is incident to the first light splitting and combining element 140 after being condensed by the relay lens 150.

The adjustment device 130 is configured to guide the light emitted by the first light source 110 and condense the light emitted by the first light source 110 onto the first light splitting and combining element 140. The adjustment device 130 can be provided with a condensing lens or a lens assembly including a plurality of lenses so that the light spot formed by the light emitted by the first light source 110 on the first light splitting and combining element 140 is relatively small.

In an embodiment, a scattering device can also be provided between the adjustment device 130 and the first light splitting and combining element 140 so that a de-coherent processing is performed on the light emitted from the first light source 110, thereby reducing an occurrence probability of a speckle to the light source light.

Figure 2:
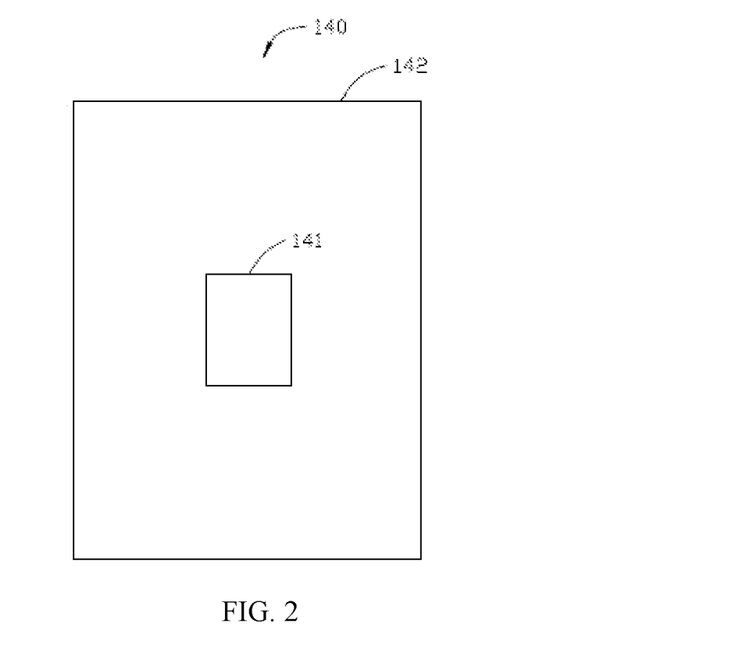
FIG. 2 is a schematic diagram of a first light splitting and combining element shown in FIG. 1.

With further reference to FIG. 2 in conjunction with FIG. 1, FIG. 2 is a schematic diagram of the first light splitting and combining element 140 shown in FIG. 1. The first light splitting and combining element 140 is disposed between the adjustment device 130 and the wavelength conversion element 180.

The first light splitting and combining element 140 includes a coating region 141 and an edge region 142. The coating region 141 is disposed at a position of a geometric center of a surface of the first light splitting and combining element 140, and the edge region 142 is arranged around the coating region 141. It can be understood that, in other embodiments, the coating region 141 and the edge region 142 can be arranged as required.

The adjustment device 130 is configured to condense the light emitted by the first light source 110 to the coating region 141. The excited light emitted from the relay lens 150 is incident to the edge region 142. The first light splitting and combining element 140 guides the light emitted by the first light source 110 and the excited light to exit to the light homogenizing device 190 in a same direction. That is, the coating region 141 guides the light emitted by the first light source 110 to the light homogenizing device 190, and the edge region 142 guides the excited light to be incident to the light homogenizing device 190. In the embodiment, the coating region 141 is configured to reflect the light emitted by the first light source 110, and the edge region 142 is configured to transmit the excited light.

Figure 3:
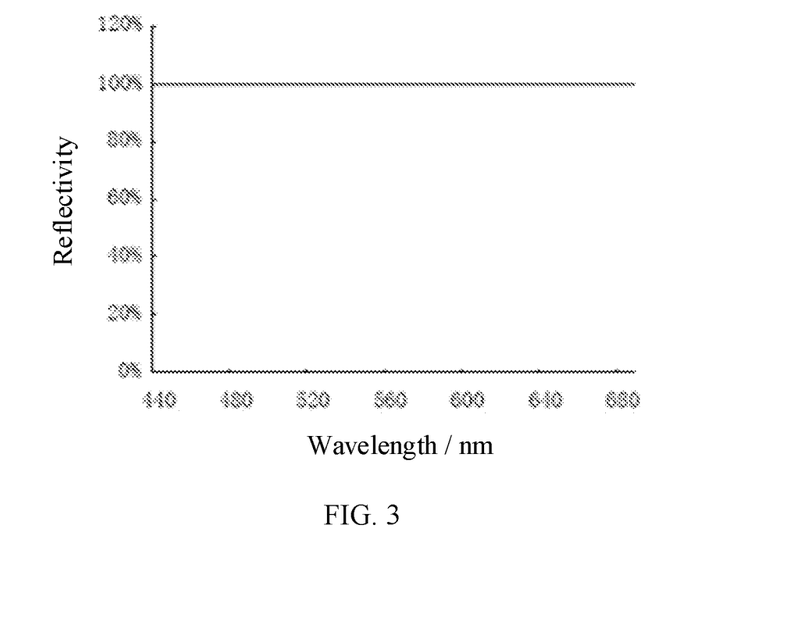
FIG. 3 shows a reflectivity curve of a coating region of the first light splitting and combining element shown in FIG. 1.
Figure 4:
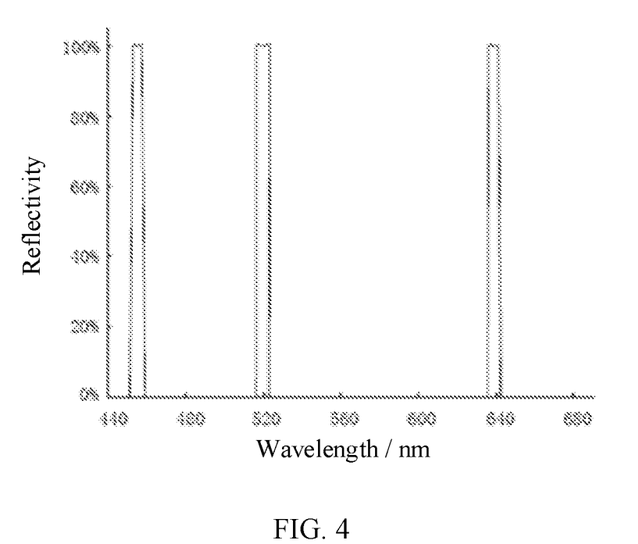
FIG. 4 is a reflectivity curve of a coating region of the first light splitting and combining element shown in FIG. 1.

With further reference to FIG. 3 in conjunction with FIG. 2, FIG. 3 shows a reflectivity curve of the coating region 141 of the first light splitting and combining element 140 shown in FIG. 1. In the embodiment, the coating region 141 is coated with a totally reflective film for reflecting visible light, that is, light having a wavelength range which does not overlap with a wavelength range of the light emitted by the first light source 110 is also reflected by the coating region 141. In another embodiment, the reflectivity curve of the coating region 141 is as shown in FIG. 4, wherein the coating region 141 is provided with a filter film which reflects light having a wavelength within the wavelength range corresponding to the light emitted by the first light source 110 and transmits light having a wavelength out of the wavelength range corresponding to the light emitted by the first light source 110.

In the embodiment, the wavelength ranges of the first blue laser light and the second blue laser light do not overlap. Since the first blue laser light and the second blue laser light are guided by the first light splitting and combining element 140 and the second light splitting and combining element 160, respectively, it can be understood that, in other embodiments, the wavelength ranges of the first blue laser light and the second blue laser light can partially overlap or completely overlap, that is, the first blue laser light source 111 and the second blue laser light source 121 can emit lights having overlapped wavelength ranges.

With further reference to FIG. 1, the light emitted by the first light source 110 is incident to the light homogenizing device 190 in the same direction as the excited light. The light homogenizing device 190 is configured to homogenize the light emitted by the first light source 110 and the excited light to obtain the light source light.

The adjustment device 130 is also configured to adjust a divergence angle of a light beam emitted by the first light source 110, in such a manner that light emitted from the first light source that is emitted from the first light splitting and combining element 140 and the excited light are incident to the light homogenizing device 190 at a same divergence angle. Therefore, the number of times, at which the light emitted by the first light source 110 and the excited light are scattered and reflected inside the light homogenizing device 190, are equivalent, so that a color of the emitted light is more uniform. In an embodiment, a scattering material is further provided inside the light homogenizing device 190, to perform decoherence on the light source light, and in this case, the scattering device between the adjustment device 130 and the first light splitting and combining element 140 can be omitted.

Figure 5:
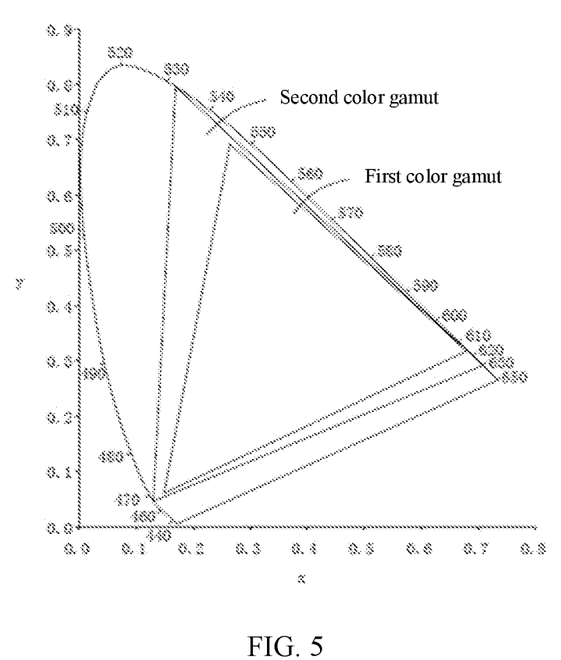
FIG. 5 shows distribution of color coordinates of the light source system shown in FIG. 1.

With further reference to FIG. 5 in conjunction with FIG. 1, FIG. 5 shows distribution of color coordinates of the light source system 100 shown in FIG. 1. The controller 125 is configured to control ON/OFF states and powers of the first blue laser light source 111, the second blue laser light source 121, the red laser light source 112 and the green laser light source 113, in such a manner that the color coordinates of the light source light can be dynamically switched.

In an embodiment, the controller 125 includes a pulse width modulation (PWM) controller capable of controlling to turn on of turn off the first blue laser light source 111, the red laser light source 112, the green laser light source 113 and the second blue laser light source 121 and adjust, by a pulse width modulation control method, proportions of the powers of the emitted light of the first blue laser light source 111, the red laser light source 112, the green laser light source 113, and the second blue laser light source 121.

In the embodiment, the wavelength conversion material is yellow phosphor which can absorb part of the second blue laser light 121 to generate yellow excited light. It can be understood that, in other embodiments, the wavelength conversion material can also be a combination of yellow phosphor and red phosphor, or a combination of yellow phosphor and green phosphor, or a combination of red phosphor and green phosphor, in order to generate the excited light having the corresponding color.

When the controller 125 controls to turn on the first blue laser light source 111 and the second blue laser light source 121 and to turn off the red laser light source 112 and the green laser light source 113, the first blue laser light and the yellow excited light are combined to form the light source light. Since the wavelength conversion is not performed on the first blue laser light, consistency of the color of the light source light is better. In this mode, the color coordinates of the light source light can reach a first color gamut in FIG. 5. Color coordinates of three primary colors of red, green, and blue in the first color gamut are red (0.68, 0.32), green (0.265, 0.69), and blue (0.15, 0.06), respectively.

When the controller 125 controls to turn on the first blue laser light source 111, the red laser light source 112 and the green laser light source 113 and to turn off the second blue laser light source 121, the first blue laser light, the red laser light, and the green laser light are combined to form the light source light. In this mode, the color coordinates of the light source light reach a second color gamut in FIG. 5. In the second color gamut, the color coordinates of the three primary colors of red, green, and blue are red (0.708, 0.292), green (0.170, 0.797), and blue (0.131, 0.046), respectively.

As shown in FIG. 5, the first color gamut is located within the second color gamut, and the red, green, and blue colors of the second color gamut all cover a wider range than those of the first color gamut, respectively.

Further, when the controller 125 controls to turn on the first blue laser light source 111, the second blue laser light source 121, and the red laser light source 112 and to turn off the green laser light source 113, the first blue laser light, the red laser light, and the yellow excited light are combined to form the light source light. Due to addition of the red laser light, the color coordinates of the light source light become wider in the red part, exceeding the first color gamut.

Further, when the controller 125 controls to turn on the first blue laser light source 111, the second blue laser light source 121, and the green laser light source 113 and to turn off the red laser light source 112, the first blue laser light, the red laser light, and the yellow excited light are combined to form the light source light. Due to addition of the green laser light, the color coordinates of the light source light become wider in a green part, exceeding the first color gamut.

Further, when the controller 125 controls to turn on the first blue laser light source 111, the second blue laser light source 121, the red laser light source 112, and the green laser light source 113, the first blue laser light, the red laser light, the green laser light, and the yellow excited light are combined to form the light source light. Due to addition of the red laser light and the green laser light, the color gamut of the light source light becomes wider in the red part and the green part, exceeding the first color gamut.

Therefore, by controlling to turn on or off the first blue laser light source 111, the red laser light source 112, the green laser light source 113, and the second blue laser light source 121, dynamical adjustment of the color coordinates of the light source light between the first color gamut and the second color gamut can be achieved.

Further, in this embodiment, the controller 125 can also adjust the proportions of the powers of the first blue laser light source 111, the red laser light source 112, the green laser light source 113, and the second blue laser light source 121, achieving dynamically switching of the color coordinates of the light source light.

Specifically, when the first blue laser light and the yellow excited light are combined to form the light source light, by adjusting the proportions of the powers of the first blue laser light source 111 and the second blue laser light source 121, proportions of the first blue laser light and the yellow excited light in the light source light are adjusted, so as to adjust the color gamut of the light source light. For example, the proportion of the power of the first blue laser light source 111 can be reduced while increasing the proportion of the power of the second blue laser light source 121, such that a proportion of the first blue laser light in the light source light is reduced, whereas a proportion of the yellow excited light increases, so that the color coordinates of the light source light become narrower in the blue part but become wider in the red and green parts. Conversely, the color coordinates of the light source light becomes wider in the blue part, and the color coordinates of the light source light become narrower in the red and green parts.

Similarly, when the first blue laser light, the red laser light, and the yellow excited light are combined to form the light source light, by adjusting the proportions of the first blue laser light source 111, the red laser light source 112 and the second blue laser light source 121, the proportions of the first blue laser light, the red laser light, and the yellow excited light in the light source light are adjusted, so as to adjust the color gamut of the light source light. For example, the proportion of the power of the first blue laser light source 111 can be reduced, and the proportions of the powers of the red laser light source 112 and the second laser light source 121 can be increased, such that in the light source light, the proportion of the first blue laser light is reduced, and the proportions of the red laser light and the yellow excited light are increased, in order to make the color coordinates of the light source light become narrower in the blue part and become wider in the red and green parts, exceeding the first color gamut.

Similarly, when the first blue laser light, the green laser light, and the yellow excited light are combined to form the light source light, by adjusting the proportions of the first blue laser light source 111, the green laser light source 113 and the second blue laser light source 121, the proportions of the first blue laser light, the green laser light, and the yellow excited light in the light source light are adjusted, so as to adjust the color gamut of the light source light. For example, the proportion of the power of the first blue laser light source 111 can be reduced, and the proportions of the powers of the red laser light source 112 and the second laser light source 121 can be increased, such that in the light source light, the proportion of the first blue laser light is reduced, and the proportions of the green laser light and the yellow excited light are increased, so as to make the color coordinates of the light source light become narrower in the blue part and become wider in the red and green parts, exceeding the first color gamut.

Similarly, when the first blue laser light, the red laser light, the green laser light, and the yellow excited light are combined to form the light source light, by adjusting the proportions of the first blue laser light source 111, the red laser light source 112, the green laser light source 113 and the second blue laser light source 121, the proportions of the first blue laser light, the red laser light, the green laser light and the yellow excited light in the light source light are adjusted, so as to adjust the color gamut of the light source light. For example, the proportion of the power of the first blue laser light source 111 can be reduced, and the proportions of the powers of the red laser light source 112, the green laser light source 113, and the second blue laser light source 121 can be increased, such that in the light source light, the proportion of the first blue laser light is reduced, and the proportions of the green laser light and the yellow excited light are increased, to make the color coordinates of the light source light become narrower in the blue part and become wider in the red and green parts, exceeding the first color gamut.

Similarly, when the first blue laser light, the red laser light, and the green laser light are combined to form the light source light, by adjusting the first blue laser light source 111, the red laser light source 112 and the green laser light source 113, the proportions of the first blue laser light, the red laser light, and the green laser light in the light source light are adjusted, so as to adjust the color gamut of the light source light. For example, the proportion of the power of the first blue laser light source 111 can be reduced, and the proportions of the red laser light source 112 and the green laser light source 113 can be increased, such that in the light source light, the proportion of the first blue light is reduced, and the proportions of the red laser light and the green laser light are increased, to make the color coordinates of the light source light become narrower in the blue part and become wider in the red and green parts, exceeding the second color gamut.

It can be understood that the proportions of the powers of the first laser light source 111, the red laser light source 112, the green laser light source 113, and the second blue laser light source 121 can be adjusted as needed, in order to adjust the proportions of lights having different colors in the light source light, thereby achieving the purpose of dynamically adjusting the color coordinates of the light source light.

Based on the above, in the present disclosure, adjusting any of the ON/OFF states and the proportions of the powers of the first laser light source 111, the red laser light source 112, the green laser light source 113, and the second blue laser light source 121 by the controller 125 can dynamically adjust the color coordinates of the light source light.

Therefore, the projection apparatus adopting the light source system 100 of the present disclosure supports various color gamut requirements, realizing the dynamic color gamut adjustment on one projection apparatus, and it has high versatility and wide compatibility and can be flexibly adapted to various application occasions, making it beneficial to promotion and application of the light source system 100 and the projection apparatus.

In an embodiment, a difference from the first embodiment of the present disclosure lies in that, the light source system does not include the adjustment device 130, the first light splitting and combining element 140, the relay lens 150, the second light splitting and combining element 160, the collecting lens group 170 and the light homogenizing device 190, and instead, includes other optical means for combining the light emitted by the first light source 110 and the yellow excited light are included. It should be noted that, within the scope of spirit or basic features of the present disclosure, the specific solutions applicable to the first embodiment can also be applied to the present embodiment correspondingly, and this will not be repeated herein in order to save space and avoid duplication.

Figure 6:
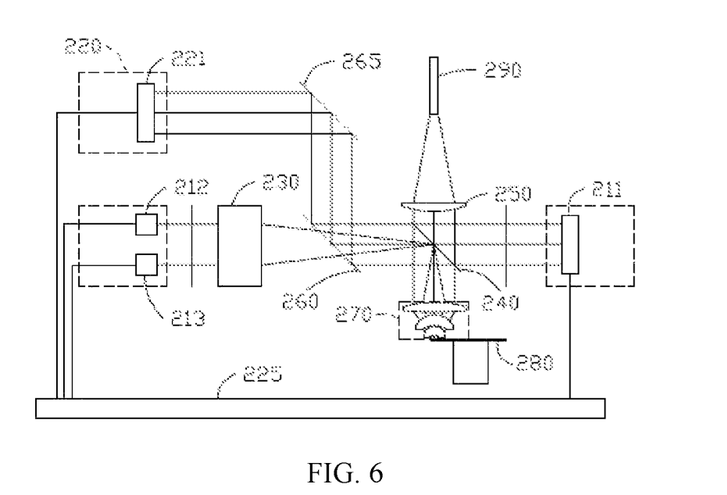
FIG. 6 is a schematic diagram of a light source system provided by a second embodiment of the present disclosure.

Referring to FIG. 6, it is a schematic diagram of a light source system 200 according to a second embodiment of the present disclosure.

The light source system 200 includes a first light source, a second light source 220, a wavelength conversion element 280, a controller 225, an adjustment device 230, a first light splitting and combining element 240, a relay lens 250, a second light splitting and combining element 260, a reflective element 265, a collecting lens group 270 and a light homogenizing device 290.

The first light source includes: a first blue laser light source 211 configured to emit first blue laser light (465 nm), a red laser light source 212 configured to emit red laser light (639 nm), and a green laser light source 213 configured to emit green laser light (520 nm). The red laser light source 212 and the green laser light source 213 are located at a first side of the wavelength conversion element 280, and the first blue laser light source 211 is located at a second side of the wavelength conversion element 280. The first side is opposite to the second side. The second light source 220 includes a second blue laser light source 221 located at the first side. A wavelength range of second blue laser light (455 nm) emitted by the second blue laser light source 221 does not overlap with a wavelength range of the first blue laser light emitted by the first blue laser light source 211.

Further, sides of the first blue laser light source 211, the red laser light source 212 and the green laser light source 213 adjacent to the wavelength conversion element 280 are each provided with a scattering device, to perform decoherence on the light emitted by the first light source.

The adjustment device 230 is disposed adjacent to the red laser light source 212 and the green laser light source 213, and the adjustment device 230 is configured to guide the red laser light and the green laser light to the second light splitting and combining element 260. The second blue laser light emitted from the second blue laser light source 221 is incident to the second light splitting and combining element 260 after being reflected by the reflective element 265.

The second light splitting and combining element 260 is disposed between the adjustment device 230 and the first light splitting and combining element 240 and configured to guide the second blue laser light, the red laser light, and the green laser light to the first light splitting and combining element 240. The second light splitting and combining element 260 can be a light-splitting filter coated with a blue-reflective and yellow-transmissive film.

Figure 7:
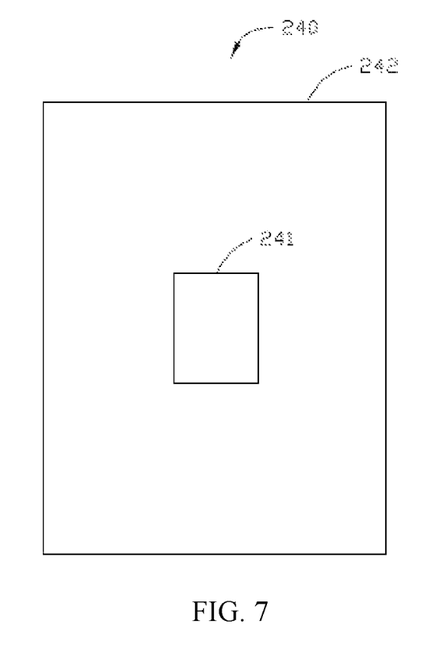
FIG. 7 is a schematic diagram of a first light splitting and combining element shown in FIG. 6.

With further reference to FIG. 7 in conjunction with FIG. 6, FIG. 7 is a schematic diagram of the first light splitting and combining element 240 as shown in FIG. 6. The first light splitting and combining element 240 is disposed between the adjustment device 230 and the wavelength conversion element 280, and specifically, the first light splitting and combining element 260 is disposed between the second light splitting and combining element 240 and the wavelength conversion element 280.

The first light splitting and combining element 240 includes a coating region 241 and an edge region 242. The second light splitting and combining element 260 guides the second blue laser light to be incident to the edge region 242. The adjustment device 230 will condense the red laser light and the green laser light, and the red laser light and the green laser light pass through the second light splitting and combining element 260 to be focused on the coating region 241.

The first light splitting and combining element 240 guides the second blue laser light, the red laser light, and the green laser light to pass through the collecting lens group 270 to be incident to the wavelength conversion element 280.

The collecting lens group 270 is disposed adjacent to the wavelength conversion element 280 and configured to condense the second blue laser light, the red laser light, and the green laser light, so that light spots formed by the second blue laser light, the red laser light, and the green laser light on the surface of the wavelength conversion element 280 are relatively small. The adjustment device 230 adjusts a divergence angle of a light beam of the red laser light and a divergence angle of a light beam of the green laser light, such that light spots, which are formed by the second blue laser light, the red laser light and the green laser light that are emitted from the first light splitting and combining element 240 after being condensed by the collecting lens group 270 and then incident onto the wavelength conversion element 280, coincide.

The wavelength conversion element 280 converts part of the second blue laser light to yellow excited light, the wavelength conversion element 280 reflects the red laser light, the green laser light and unconverted part of the second blue laser light, and the red laser light, the green laser light, the yellow excited light and the unconverted second blue laser light are emitted from the wavelength conversion element 280 in a same direction, collimated by the collecting lens group 270, and then incident to the edge region 242; in addition, the first blue laser light is incident to the edge region 242 from the second side.

After the edge region 242 guides the light emitted by the first light source and the yellow excited light to exit in the same direction, the light emitted by the first light source and the yellow excited light sequentially pass through the relay lens 250 and the light homogenizing device 290 to obtain the light source light. A structure and a function of the coating region 241 in the present embodiment are the same as those of the coating region 141 described in the first embodiment and will not be repeated here. The edge region 242 can be a light-splitting filter coated with a blue-reflective and yellow-transmissive film, and configured to reflect the first blue laser light and the second blue laser light and transmit the yellow excited light.

It should be noted that, within the scope of spirit or basic features of the present disclosure, the specific solutions applicable to the first embodiment can also be applied to the second embodiment correspondingly, and this will not be repeated herein.

In the second embodiment of the present disclosure, the adjusting method of the color coordinates of the light source light is the same as the adjusting method of the color coordinates of the light source light described in the first embodiment of the present disclosure, so it will not be repeated herein. The projection apparatus equipped with the light source system 200 can realize the dynamic color gamut adjustment on a single projection apparatus, and it has high versatility and wide compatibility and can be flexibly adapted to various application occasions, making it beneficial to promotion and application of the light source system 200 and the projection apparatus.

The above are only the embodiments of the present disclosure and do not limit the patent scope of the present disclosure. Any equivalent structure or equivalent process transformation made by using the description and drawings of the present disclosure, or those directly or indirectly used in other related technical fields, are similarly included in the patent protection scope of the present disclosure.

What is claimed is:

1. A light source system, comprising:
a first light source comprising a first blue laser light source configured to emit first blue laser light, a red laser light source configured to emit red laser light, and a green laser light source configured to emit green laser light;
a second light source comprising a second blue laser light source;
a wavelength conversion element configured to convert second blue laser light into excited light; and
a controller configured to control ON/OFF states and powers of the first blue laser light source, the red laser light source, the green laser light source and the second blue laser light source in such a manner that color coordinates of light source light are capable of being dynamically switched.

2. The light source system according to claim 1, wherein when the controller controls to turn on the first blue laser light source, the red laser light source, and the green laser light source and to turn off the second blue laser light source, the first blue laser light, the red laser light and the green laser light are combined to form the light source light.

3. The light source system according to claim 1, wherein when the controller controls to turn on the first blue laser light source and the second blue laser light source and to turn off the red laser light source and the green laser light source, the first blue laser light and the excited light form the light source light.

4. The light source system according to claim 1, wherein the controller controls to combine the excited light with the first blue laser light and at least one of the red laser light and the green laser light to form the light source light.

5. The light source system according to claim 4, wherein when the controller controls to turn on the first blue laser light source and the second blue laser light source and to turn on at least one of the red laser light source and the green laser light source, the excited light is combined with the first blue laser light and at least one of the red laser light and the green laser light to form the light source light.

6. The light source system according to claim 1, wherein the controller is configured to adjust powers of the first blue laser light source, the red laser light source, the green laser light source and the second blue laser light source so as to adjust a range of color coordinates of the light source light.

7. The light source system according to claim 1, wherein the first blue laser light has a wavelength range that does not overlap with a wavelength range of the second blue laser light.

8. The light source system according to claim 1, further comprising:
   an adjustment device; and
   a first light splitting and combining element provided between the adjustment device and the wavelength conversion element and comprising a coating region and an edge region, wherein the excited light is incident to the edge region,
   wherein the adjustment device is configured to condense light emitted by the first light source to the coating region, and the first light splitting and combining element is configured to guide the light emitted by the first light source and the excited light which is yellow to exit in a same direction.

9. The light source system according to claim 8, wherein the coating region is configured to reflect the light emitted by the first light source, and the edge region is configured to transmit the yellow excited light.

10. The light source system according to claim 9, wherein the coating region is provided with a totally reflective film or a filter film, and wherein the filter film is configured to reflect light having a wavelength within a wavelength range corresponding to the light emitted by the first light source.

11. The light source system according to claim 8, further comprising:
   a relay lens provided between the wavelength conversion element and the first light splitting and combining element, wherein the yellow excited light emitted from the wavelength conversion element is incident to the first light splitting and combining element after being condensed by the relay lens; and
   a light homogenizing device configured to homogenize light exited from the first light splitting and combining element to obtain the light source light,
   wherein the adjustment device is further configured to adjust a divergence angle of a light beam emitted by the first light source so that the excited light exited from the first light splitting and combining element and the light emitted by the first light source are emitted at a same divergence angle.

12. The light source system according to claim 1, further comprising:
   an adjustment device adjacent to the red laser light source and the green laser light source; and
   a first light splitting and combining element provided between the adjustment device and the wavelength conversion element and comprising a coating region and an edge region, wherein the first blue laser light and the second blue laser light is incident to the edge region,
   wherein the adjustment device is configured to condense the red laser light and the green laser light to the coating region, and the first light splitting and combining element is configured to guide the second blue laser light, the red laser light, and the green laser light to the wavelength conversion element;
   wherein the wavelength conversion element is configured to reflect the red laser light and the green laser light, and wherein the red laser light, the green laser light, and the excited light are emitted from the wavelength conversion element to the edge region in a same direction; and
   wherein the edge region is configured to guide light emitted by the first light source and the excited light to exit in a same direction to obtain the light source light.

13. The light source system according to claim 12, wherein the coating region is configured to reflect the light emitted by the first light source, and the edge region is configured to reflect the first blue laser light and the second blue laser light and transmit the excited light.

14. The light source system according to claim 12, further comprising:
   a collecting lens group adjacent to the wavelength conversion element,
   wherein the adjustment device is configured to adjust a divergence angle of a light beam of the red laser light and a divergence angle of a light beam of the green laser light, in such a manner that after exiting from the first light splitting and combining element and being condensed by the collecting lens group, the second blue laser light, the red laser light, and the green laser light are incident onto the wavelength conversion element to form coincident light spots; and wherein the excited light which is yellow, the red laser light, and the green laser light are emitted from the wavelength conversion element, collimated by the collecting lens group and then incident to the edge region.

15. The light source system according to claim 12, further comprising:
   a second light splitting and combining element disposed between the adjustment device and the first light splitting and combining element and configure to guide the second blue laser light, the red laser light and the green laser light to the first light splitting and combining element.

16. A projection apparatus, comprising a light source system, wherein the light source system comprises:
   a first light source comprising a first blue laser light source configured to emit first blue laser light, a red laser light source configured to emit red laser light, and a green laser light source configured to emit green laser light;
   a second light source comprising a second blue laser light source;
   a wavelength conversion element configured to convert second blue laser light into excited light; and
   a controller configured to control ON/OFF states and powers of the first blue laser light source, the red laser light source, the green laser light source and the second blue laser light source in such a manner that color coordinates of light source light is capable of being dynamically switched.

17. The projection apparatus according to claim 16, wherein when the controller controls to turn on the first blue laser light source, the red laser light source, and the green laser light source and to turn off the second blue laser light source, the first blue laser light, the red laser light and the green laser light are combined to form the light source light.

18. The projection apparatus according to claim 16, wherein when the controller controls to turn on the first blue laser light source and the second blue laser light source and to turn off the red laser light source and the green laser light source, the first blue laser light and the excited light form the light source light.

19. The projection apparatus according to claim 16, wherein the controller controls to combine the excited light with the first blue laser light and at least one of the red laser light and the green laser light to form the light source light.

20. The projection apparatus according to claim 19, wherein when the controller controls to turn on the first blue laser light source and the second blue laser light source and to turn on at least one of the red laser light source and the green laser light source, the excited light is combined with the first blue laser light and at least one of the red laser light and the green laser light to form the light source light.

* * * * *